United States Patent
Davy et al.

[15] 3,666,717
[45] May 30, 1972

[54] POLYAMIDES STABILIZED WITH A PHOSPHINE

[72] Inventors: Geoffrey Spencer Davy; Vincent Matthews, both of Manchester, England

[73] Assignee: Imperial Chemical Industries Limited, London, England

[22] Filed: Apr. 14, 1970

[21] Appl. No.: 28,499

[30] Foreign Application Priority Data

Apr. 15, 1969 Great Britain..................19,156/69

[52] U.S. Cl.................260/45.95, 260/45.7 P, 260/45.85, 260/45.9 R
[51] Int. Cl................C08g 51/56, C08g 51/58, C08g 51/60
[58] Field of Search...............260/45.7 P, 45.85, 45.9 R, 260/45.95

[56] References Cited

UNITED STATES PATENTS

| | | | |
|---|---|---|---|
| 3,384,615 | 5/1968 | Agouri et al. | 260/45.9 |
| 3,039,999 | 6/1962 | Linville et al. | 260/75 |
| 3,078,248 | 2/1963 | Ben | 260/30.6 |
| 3,180,849 | 4/1965 | Thompson | 260/45.7 |
| 3,274,151 | 9/1966 | Settele | 260/45.75 |
| 3,285,855 | 11/1966 | Dexter et al. | 252/57 |
| 3,428,597 | 2/1969 | Dikotter et al. | 260/45.75 |
| 3,505,285 | 4/1970 | Hermann et al. | 260/45.75 |
| 3,533,986 | 10/1970 | Davy | 260/37 |
| 3,553,161 | 1/1971 | Hermann et al. | 260/45.75 |

*Primary Examiner*—Donald E. Czaja
*Assistant Examiner*—R. A. White
*Attorney*—Cushman, Darby and Cushman

[57] ABSTRACT

Synthetic linear polyamides which are stabilized against the degradative effect of heat by the incorporation therein of phosphine or of certain primary or secondary organophosphines, optionally together with a substituted phenolic or substituted diphenylamine antioxidant. These phosphines have a reduced adverse effect on the dispersion properties of titanium dioxide when used as a pigment in polyamides, compared with other phosphorus-containing stabilizers.

9 Claims, No Drawings

POLYAMIDES STABILIZED WITH A PHOSPHINE

This invention relates to synthetic linear polyamides and to their stabilization against the degradative effects of high temperature.

By synthetic linear polyamides we mean condensation polymers which contain recurring amide groups as an integral part of the main polymer chain and which are obtained by the polycondensation of aminocarboxylic acids or lactams thereof or of mixtures of diamines with dicarboxylic acids, including interpolyamides obtained by the polycondensation of mixtures of different polyamide-forming components. More particularly we mean the class of polyamides known generically as nylons of which polyhexamethylene adipamide and polycaprolactam are familiar examples. Within this class are also included interpolyamides, for example that obtained by the polycondensation of a mixture of hexamethylene diammonium adipate with caprolactam.

The nylons are eminently suitable for spinning, usually by a melt spinning technique, into filaments or fibers which are subsequently fashioned into textile articles for example yarns or knitted or woven fabrics. Nylon textiles are frequently subjected to operations involving exposure to high temperatures. For example, they may be heat set in order to stabilize the dimensions and shape of the article so that it is not distorted during subsequent processing. In particular, nylon textiles, especially fabrics, which are to be dyed are heat set before dyeing in order to avoid distortion and creasing during the dyeing operation. Nylon fabrics, for example, are heat set on a stenter. Exposure of nylon textiles to heat, however, may result in some degradation of the polyamide. This degradation may manifest itself in a discoloration of the nylon textile so that a white material appears less white. The degradation may also manifest itself, however, in a modification of the dyeing properties of the nylon textile. The end groups of the polymer chains of the polyamide molecules of nylon are usually either carboxyl or amino groups. The proportions of these groups relative to each other and relative to the polymer as a whole influence the dyeing properties of the nylon textile. In particular the dyeing properties with anionic dyestuffs are influenced by the proportion of amine end groups, and the affinity for anionic dyestuffs is reduced if the proportion of amine end groups is reduced. It is well known that exposure of nylon textiles to high temperatures results in a reduction of the proportion of amine end groups, and causes a reduction in the affinity for anionic dyestuffs. However, in practice the effect is not obtained in a uniform manner, so that when fabrics which have been heat set are subsequently dyed with anionic dyestuffs, for example acid dyestuffs, it is frequently found that the fabric has a striped appearance due to portions of the fabric having dyed to a deeper shade than others. It is believed that these stripes are caused by variations in the amine end group content of the polyamide forming the yarns from which the fabric is woven or knitted.

Polyamide fibers usually have incorporated into them delustrants which increase the opacity and reduce the glossy appearance of the fibers the most common compound which is used for this purpose being titanium dioxide. The titanium dioxide is normally added to the polymerization autoclave in the form of an aqueous dispersion while polymer formation is in progress.

It has been proposed to stabilize polyamides, including those containing delustrants, against the degradative effects of high temperature by incorporating into the polyamide an organic antioxidant in conjunction with certain oxy acids of phosphorous or salts and esters thereof, but whereas these additives are effective stabilizers they frequently suffer from the disadvantage that they cause aggregation of titanium oxide dispersions during the polymer-forming process resulting in the polyamide having a poor spinning performance.

We have now found that heat stabilization of polyamides may be achieved by the use of phosphine or certain organophosphines, and that the adverse effect on the dispersion properties of titanium dioxide is much less using these stabilizers than is the case with the stabilizing systems mentioned above.

According to the present invention there are provided synthetic linear polyamides stabilized against the degradative effect of heat by the incorporation into the polyamide of a stabilizing amount of a phosphine or of an organophosphine having the general formula:

wherein $X_1$ and $X_2$ each independently represent a hydrogen atom, or an alkyl, cycloalkyl, aralkyl, or aryl group, any one of which may be substituted by hydroxyl, carboxyl or amino groups and when $X_1$ and $X_2$ represent alkyl, aralkyl or aminoalkyl groups, $X_1$ and $X_2$ together may form a bivalent radical which together with the phosphorous atom forms a heterocyclic ring.

As examples of the hydrocarbon and substituted hydrocarbon groups represented by $X_1$ and $X_2$ there may be mentioned methyl, ethyl, propyl, butyl, lauryl, stearyl, hydroxymethyl, phenyl, aminophenyl and carboxyphenyl, and as examples of bivalent radicals formed by $X_1$ and $X_2$ taken together there may be mentioned the tetramethylene radical, the pentamethylene radical and the radical

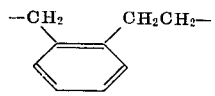

A preferred class of organophosphines is that comprising compounds having the above formula wherein one of $X_1$ and $X_2$ represents a hydrogen atom and the other represents an alkyl group containing up to 18 carbon atoms. Particularly preferred because of their lower volatility and consequently greater ease of incorporation into polyamides are members of this class having alkyl groups containing from eight to 18 carbon atoms.

As specific examples of organophosphines which may be used in the present invention there may be mentioned phenyl phosphine, cyclotetra-methylene phosphine and 1,2,3,4-tetrahydroisophosphinoline,

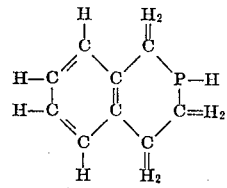

but preferred compounds are lauryl phosphine and stearyl phosphine.

By a stabilizing amount we mean an amount sufficient to achieve a stabilizing effect, and it is preferred to use a quantity of the phosphine or organophosphine such that the polymer contains from 10 to 5,000 parts per million of phosphorus.

The phosphine or organophosphine may also be used in conjunction with an organic antioxidant which may be a substituted phenol or a substituted diphenylamine, the two components acting in synergistic relationship with one another so that the stabilizing effect achieved is greater than would be expected from the use of either the phosphorus compound or the organic antioxidant alone, and this forms a further feature of the invention.

The antioxidant will normally be added to the polymer-forming ingredients and subjected to the conditions prevailing during polymer formation and the resultant polyamide usually has to be melted after formation, so that the antioxidant must be stable under all the conditions which are likely to occur in practice.

With regard to substituted phenolic antioxidants not all phenols fulfil this condition but those that do may be used in the invention. Particularly suitable, however, are the so-called sterically hindered phenols. A particularly suitable class of sterically hindered phenols comprises those compounds which carry in the *para* or preferably the *ortho* position to the phenolic hydroxyl group a group which is attached to the phenol nucleus through a carbon atom of the said group which is a saturated carbon atom and is attached to at least two and preferably to three carbon atoms in addition to the carbon atom of the phenol nucleus. Examples of such groups are sec.-alkyl and especially tert.- alkyl groups, for example tert.- butyl groups, and cycloalkyl groups, especially cycloalkyl groups carrying an alkyl group on the carbon atom through which they are attached to the phenol nucleus, for example a 1-methyl-1-cyclohexyl group. Specific examples of suitable phenols are 2-α-methylcyclohexyl-4,6-dimethylphenol, bis-(2-hydroxy-3-α-methylcyclohexyl-5-methylphenyl)-methane, 1,1,3-tris-(2'-methyl-4'-hydroxy-5'-tert.-butylphenyl)butane, 1,1,5,5-tetrakis-(2'-methyl-4'-hydroxy-5'tert.-butylphenyl)-pentane,2,6-di-tert.-butyl-4-methylphenol, 1,2-bis(2'-hydroxy-3'-tert.-butyl-5'-methylphenyl)ethane, 1,1,5,5-tetrakis(2'-hydroxy-3'-tert.-butyl-5'-methylphenyl)pentane, bis-(2-hydroxy-3-tert.-butyl-5-ethylphenyl) methane and 2,6-di-tert.-butyl-4-diethyl-carbamoylthiomethylphenol. 1,1,3 -Tris-(2'-methyl-4'-hydroxy-5'-tert.-butylphenyl)butane and 1,1,5,5-tetrakis-(2'-methyl-4'-hydroxy-5'-tert.-butylphenyl)pentane are particularly suitable.

The stabilizing amount of such phenols incorporated with the polyamide to ensure adequate stability may fall within the range of from 0.01 to 10 percent by weight of the polyamide but is preferably within the range of from 0.01 to 2 percent by weight.

Other phenols which may be used as antioxidants are those which are substituted in the aromatic nucleus by a hydrocarbon radical and which contain in addition a carboxyl group or a group derived from a carboxyl group.

By a group derived from a carboxyl group we mean a group characterizing a functional derivative of a carboxylic acid. Such groups include in particular carboxylic ester groups, carbamoyl groups (including N-substituted carbamoyl groups) and cyano groups. The term carboxyl group includes salts of carboxyl groups whether inorganic salts or salts with organic bases.

The hydrocarbon radical is preferably situated in one of the *ortho* positions in the phenolic hydroxy group and particularly suitable hydrocarbon radicals are those defined above in connection with phenolic antioxidants which do not contain a carboxy group.

The carboxy group, or the group derived from a carboxyl group, which is another of the characteristics of the stabilizing compounds used in our invention, may be directly attached to the phenolic nucleus. However, we prefer it to be separated from the phenolic nucleus by one or more atoms, which are preferably, but not necessarily, all carbon atoms. Particularly suitable bivalent radicals for linking the carboxyl group or derived group to the phenolic nucleus are alkylene radicals, especially those having a small number of carbon atoms, for example methylene, ethylene and propylene radicals.

In addition to the hydrocarbon radical and carboxyl group or derived group, the phenols may be substituted by other groups. However, it is undesirable for there to be present any group which would cause the phenol to decompose in the polyamide when molten, and this limits the kind of substituents which may be present. There may, however, be present in the phenolic antioxidant more than one hydrocarbon radical, and more than one carboxyl group or derived group. Alkoxy groups may also be present.

The carboxy group-containing phenols which may be used in the present invention include bis-phenols which are substituted in at least one of the phenolic nuclei by a hydrocarbon radical and which contain at least one carboxyl group or derived group. By a bis-phenol we mean a compound the molecule of which consists of two phenol molecules, the same or different, linked together, either directly or through an intermediate bivalent linking radical. As examples of linking radicals there may be mentioned alkylene, sulphide and sulphone. The carboxyl group or derived group which is present in the phenol may form a part of the linking radical.

A particularly valuable class of phenols which contain a hydrocarbon radical and in addition a carboxyl group or a group derived therefrom and which may be used in our invention is that which may be represented by the general formula

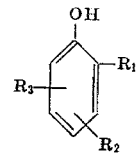

in which $R_1$ represents a tertiary alkyl group, an aralkyl group or cycloalkyl group, $R_2$ represents an alkyl, cycloalkyl, aryl, aralkyl or alkoxy group or a group — A — X in which A represents a direct link or an alkylene radical and X represents a carboxyl, carbamoyl, carboxylic ester or cyano group, and $R_3$ represents the group —A —X Having the same significance as above or, when $R_2$ is not — A — X, may represent the group

where A represents an alkylene radical and X and $X^1$ represent carboxyl, carbamoyl, carboxylic ester or cyano groups and may be the same or different. The tertiary alkyl groups in the above formula preferably contain from four to 12 carbon atoms, the alkyl, alkylene and alkoxy groups from one to 12 carbon atoms, and the cycloalkyl, aralkyl and aryl groups up to 12 carbon atoms. As specific examples of tertiary alkyl groups there may be mentioned tert.-butyl, tert.-amyl, tert.-octyl and tert.-nonyl groups. As specific examples of alkyl groups there may be mentioned methyl, ethyl, propyl, butyl, hexyl, octyl, decyl and dodecyl groups. As specific examples of alkylene groups there may be mentioned methylene, ethylene, propylene, hexamethylene, octamethylene and dodecamethylene. As specific examples of alkoxy groups there may be mentioned methoxy and ethoxy. As specific examples of cycloalkyl groups there may be mentioned cyclopentyl, cyclohexyl and methylcyclohexyl. As specific examples of aralkyl groups there may be mentioned benzyl and phenylethyl. As specific examples of aryl groups there may be mentioned phenyl, tolyl, xylyl and naphthyl. As specific examples of carbamoyl groups there may be mentioned carbamoyl, N-methyl-carbamoyl and N,N-diethylcarbamoyl. As specific examples of carboxylic ester groups there may be mentioned carbomethoxy and carboethoxy.

As specific examples of phenols containing carboxy groups or groups derived from carboxy groups which may be used in our invention there may be mentioned β-(4-hydroxy-3-α-methylcyclohexyl-5-methylphenyl)propionic acid, β-(4-hydroxy-3,5-di-tert.-butyl-phenyl)propionic acid, 4-hydroxy-3,5-di-tert.-butylphenylacetamide, 2-(4'-hydroxy-3',5'-di-tert.-butylphenyl)butane-1,4-dicarboxylic acid, hexamethylenediammonium 1-(4'-hydroxy-3',5'-di-tert.-butylphenyl)pentane-2,5-dicarboxylate, β-(2-hydroxy-3-tert.-butyl-5-methoxyphenyl)propionic acid, ethyl 4-hydroxy-3,5-di-tert.-butylbenzoate, benzoate, β,β-bis(4-hydroxy-3,5-di-tert.-butyl-phenyl)butyric acid and 3,3-methylene bis (4-hydroxy-5-tert.-butyl hydrocinnamic acid).

The phenols containing carboxy groups or groups derived therefrom and which may be used in our invention may be prepared by methods generally known to the art; for example phenol may be condensed with olefinically unsaturated carboxylic acids or their derivatives or with keto acids or their derivatives, and the products alkylated by reaction with an olefine.

The amount of phenol of the above defined structure which is incorporated into polyamides according to our invention may vary widely from as little as 0.01 percent to as much as 5 percent or more expressed as percent by weight of the weight of the polyamide. The amount of such phenol which may be added, however, depends to some extent on the nature of the phenol. It is believed that in many instances the phenol, being a carboxylic acid or a functional derivative of a carboxylic acid, takes part in the polycondensation reaction leading to formation of the polyamide, particularly in those cases in which the phenol is added to the polyamide-forming ingredients or during the polycondensation. Where the phenol contains a single carboxyl group or a derived group which is sufficiently labile for it to take part in the polycondensation reaction, for example a carboxylic ester group, the phenol may act as a 'chain-stopper' in the polycondensation reaction, that is to say it acts to limit the degree of polycondensation and hence to limit the viscosity of the derived polymer. In this case, depending on the degree of polycondensation required, the amount of phenol may have to be limited. Normally however, amounts up to 0.5 percent by weight of the polyamide are permissible. Where the phenol contains two carboxylic groups, or derived groups which can take part in the polycondensation reaction, it does not function as a 'chain-stopper' and larger amounts, up to 5 percent by weight of the polyamide or more, may be added without limiting the degree of polycondensation. Where, however, the polyamide is obtained by polycondensation of a diamine with a dicarboxylic acid, and the phenol is itself a dicarboxylic acid, or a functional derivative thereof which can take part in the polycondensation reaction, it is desirable to keep the proportion of total diamine and total dicarboxylic acid (including the functional derivative) in approximate stoichiometric balance by having present an amount of diamine stoichiometrically equivalent to the phenol as well as an amount equivalent to the dicarboxylic acid forming the major acid constituent of the polyamide.

The substituted diphenylamines which may be used as antioxidants in the present invention are diphenylamines which are substituted in each of the positions *para* to the amino group by an alkyl, cycloalkyl or aralkyl group.

Preferred substituted diphenylamines are those having the general formula

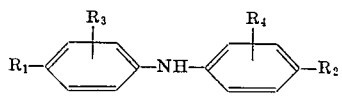

in which $R_1$ and $R_2$ represent alkyl, cycloalkyl, or aralkyl groups having up to 12 carbon atoms, and may be the same or different, and $R_3$ and $R_4$ represent hydrogen atoms, or alkyl, cycloalkyl or aralkyl groups having up to 12 carbon atoms, and may be the same or different. We particularly prefer that the groups represented by $R_1$ and $R_2$ are groups which are joined to the diphenylamine residue through a carbon atom of the group which is a saturated tertiary carbon atom. As examples of such groups there may be mentioned t-butyl, t-octyl (1,1,3,3-tetramethylbutyl), α,α-dimethylbenzyl and α-methylcyclohexyl. As examples of other alkyl, cycloalkyl and aralkyl groups which $R_1$ and $R_2$ may represent there may be mentioned methyl, ethyl, n-propyl, isopropyl, n-butyl, sec.-butyl, iso-butyl, amyl, hexyl, octyl, decyl, dodecyl, cyclopentyl, cyclohexyl, methylcyclopentyl, methylcyclohexyl, benzyl, α-methylbenzyl and phenylethyl. The groups represented by $R_3$ and $R_4$ are preferably hydrogen atoms or lower alkyl groups, that is alkyl groups having from one to four carbon atoms, but may be any of the groups which $R_1$ and $R_2$ may represent. As specific examples of the substituted diphenylamines there may be mentioned 4,4'-bis(1,1,3,3-tetramethylbutyl)diphenylamine, 2,2'-dimethyl-4,4'-di-t-butyl diphenylamine, 3,3'-dimethyl-4,4'-di-(1,1,3,3-tetramethylbutyl)diphenylamine, 4,4'-bis-(α, α-dimethylbenzyl)diphenylamine, 2,2'-di(α-methylbenzyl)-4,4'-di-t-butyldiphenylamine and 4,4'-di-(α-methylcyclohexyl)diphenylamine.

The substituted diphenylamine may be used in amounts of up to 5 percent by weight of the polyamide but preferred amounts range from 0.02 to 2 percent.

According to a further feature of the invention there is provided a process for the manufacture of synthetic linear polyamides stabilized against the degradative effect of heat which comprises heating, so as to effect polycondensation, ingredients which give rise to the said polyamide by polycondensation and which is characterized in that there is added to the said ingredients, to the said polyamide or to the polycondensation reaction mixture during polycondensation a stabilizing amount of a phosphine or an organophosphine as hereinbefore defined, optionally in conjunction with an organic antioxidant as hereinbefore defined.

The general conditions for effecting the polycondensation reaction of our invention are well known to the art and detailed description is unnecessary. In general, the polyamide-forming ingredients are heated until the desired degree of polycondensation is achieved. In the case of aminocarboxylic acids, or of mixtures of, or salts of, diamines with dicarboxylic acids, water is formed in the polycondensation reaction and provision must be made for its removal. It may be convenient to start with the ingredients in the form of an aqueous solution. It may be advantageous to carry out the polycondensation in an atmosphere of a non-oxidizing gas, for example nitrogen, and in an autoclave under pressure with provision for removing water from the reaction mixture by bleeding off as steam. The temperature of the reaction mixture is usually raised gradually to that required to effect the desired degree of polycondensation, which temperature may be within the range 250° to 300° C. The phosphine or organophosphine and, if desired, the organic antioxidant may be added to the finished polyamide but we prefer to add them either during the polycondensation reaction or more especially to the polyamide-forming ingredients before polycondensation commences.

Other additions may be made to the polyamide-forming ingredients or during the polycondensation reaction. Thus there may be added viscosity stabilizers, for example acetic acid, pigments or light stabilizers for example manganese salts. Where titanium dioxide is used it can be coated with a manganese compound.

The invention is illustrated but not limited by the following examples in which parts and percentages are by weight.

In the examples the b-chromaticity is the ratio of the percent reflected blue light to the sum of the percent reflected blue, green and red light and is similar to the z trichromatic coefficient of the International Commission on Illumination System (Handbook of Colorimetry, A.C. Hardy, The Techology Press, Cambridge, Mass., U.S.A.).

EXAMPLE 1

5,240 Parts of nylon 6.6 salt (hexamethylene diammonium adipate). 2,500 parts of distilled water, 22.7 parts of 26.4 percent aqueous acetic acid solution and 2.26 parts of 1,1,3-tris(2'-methyl-4'-hydroxy-5'-tert.-butyl phenyl)butane were heated in an autoclave to a temperature of about 215° C. and a pressure of 250 lb. per square inch. The heating was continued and the pressure maintained at 250 lbs. per square inch by bleeding off steam. At a temperature of 220° C. 226 parts of a 40 percent aqueous dispersion of titanium dioxide was added via a lock, followed after 2 minutes by 6.5 parts of phenyl phosphine. When a temperature of 240° C. was reached, the pressure was gradually reduced to atmospheric during 60 minutes after which time the temperature had risen to about 270° C. As soon as atmospheric pressure was reached a slow stream of nitrogen was passed through the autoclave. After 10 minutes agitation the polymer was extruded from the autoclave under nitrogen pressure as a ribbon and quenched with water. The polymer ribbon was then chipped. The polymer chips were melted and spun at 190° C. into a yarn of nine filaments. Four strands were splied together and drawn and twisted to a total denier of 108. Yarn was also spun in the same way from polymer chip made without any addition of 1,1,3-tris (2'-methyl-4'-hydroxy-5'-tert.-butylphenyl)butane or phenyl phosphine.

The yarns were heated at 220° C. for 30 seconds. The b-chromaticity of the yarns was measured before and after heating using a Colormaster Mark 5 colorimeter. The amine end group concentration in the yarn was determined before and after heating by titration of a solution in phenol and methanol with N/20 hydrochloric acid. The results are given in the following table:

| Additives | b-chromaticity | | | Percentage of amine end groups lost |
|---|---|---|---|---|
| | Before test | After test | Loss | |
| None | 0.3165 | 0.2770 | 0.0395 | 55.2 |
| 1,1,3-Tris(2'-methyl-4'-hydroxy-5'-tert.-butylphenyl)butane (0.05%) and phenyl phosphine (0.144%) | 0.3243 | 0.2943 | 0.0300 | 33.2 |

EXAMPLE 2

50 Parts of nylon 6.6 salt (hexamethylene diammonium adipate), 0.025 parts of 1,1,3-tris(2'-methyl-4'-hydroxy-5'-tert.-butylphenyl)butane and 0.23 part of stearyl phosphine were sealed into an evacuated Carius tube and the tube was heated at 220° C. for 4 hours. After cooling, the tube was opened and the partly polymerized contents were broken into small pieces and further heated at 275° C. under atmospheric steam pressure for 60 minutes. The resulting nylon 6.6 polymer was chipped and the polymer chips were melted and spun at 290° C. into a yarn of nine filaments. Four strands were plied together and drawn and twisted to a total denier of 108.

EXAMPLE 3

The preparation described in Example 2 was repeated except that the 1,1,3-tris(2'-methyl-4'-hydroxy-5'-tert.-butylphenyl)butane was omitted.

EXAMPLE 4

The preparation described in Example 2 was repeated except that the 1,1,3-tris(2'-methyl-4'-hydroxy-5'-tert.-butylphenyl)butane was omitted and the 0.23 part of stearyl phosphine was replaced by 0.16 part of lauryl phosphine.

EXAMPLE 5

The preparation described in Example 2 was repeated except that both the 1,1,3-tris(2'-methyl-4'-hydroxy-5'-tert.-butylphenyl)butane and the stearyl phosphine were omitted. This polymer was used as a control for Examples 2 to 4.

Samples of yarn prepared in Examples 2 to 5 were tested to determine b-chromaticity values and amine end group loss as described in Example 1. The results are shown in Table II.

TABLE II

| Example No. | b-chromaticity | | | percentage of Amine end groups lost |
|---|---|---|---|---|
| | Before Test | After Test | Loss | |
| 2 | 0.3034 | 0.2819 | 0.0215 | 34.0 |
| 3 | 0.3099 | 0.2850 | 0.0249 | 39.8 |
| 4 | 0.3046 | 0.2856 | 0.0190 | 29.9 |
| 5 | 0.3078 | 0.2735 | 0.0343 | 47.7 |

EXAMPLE 6

5,240 Parts of nylon 6.6 salt (hexamethylene diammonium adipate), 2,500 parts of distilled water, 22.7 parts of 26.4 percent aqueous acetic acid solution and 2.26 parts of 1 1,3-tris(2'-methyl-4'-hydroxy-5'-tert.-butylphenyl)butane were heated in an autoclave to a temperature of about 215° C. and a pressure of 250 lbs. per square inch. The heating was continued and the pressure maintained at 250 lbs. per square inch by bleeding off steam. At a temperature of 220° C., 226 parts of 40 percent aqueous dispersion of titanium dioxide was added via a lock. When a temperature of 240° C. was reached, the pressure was gradually reduced to that of the atmosphere during 60 minutes, after which time the temperature had risen to about 270° C. As soon as atmospheric pressure was reached the polymer was extruded under slight nitrogen pressure as a ribbon, water quenched and chipped.

a. A sample of the polymer chips prepared as described above (50 parts) was stirred slowly under a slow steam of nitrogen in the presence of 0.16 part of lauryl phosphine at 298° C for 15 minutes and then allowed to cool. When cold, the polymer was broken into small pieces and converted into yarn in a similar manner to that described in Example 2.

b. A further sample of the polymer chips prepared as described in the first paragraph of this Example (50 parts) was stirred slowly under a slow steam of nitrogen in the presence of 0.23 part of stearyl phosphine at 298° C. for 15 minutes and then allowed to cool. When cold, the polymer was broken into small pieces and converted into yarn in a similar manner to that described in Example 2.

c. A sample of the polymer chips prepared as described in the first paragraph of this example was treated as described in paragraph (a) but excluding the organic phosphine component.

EXAMPLE 7

This is a comparative example.

The preparation described in Example 1 was repeated except that the 6.5 parts of phenyl phosphine were replaced by 18.7 parts of triphenyl phosphine.

EXAMPLE 8

This is a comparative example.

The preparation described in Example 1 was repeated except that the 2.26 parts of 1,1,3-tris-(2'-methyl-4'-hydroxy-5'-tert.-butylphenyl)butane were omitted and the 6.5 parts of phenyl phosphine were replaced by 18.7 parts of triphenyl phosphine.

Samples of the yarns prepared as described in Examples 6a, 6b, 6c, 7 and 8 were tested to determine b-chromaticity values and amine and group loss as described in Example 1. The results are shown in Table III below.

TABLE III

| Example No. | b-chromaticity | | | Percentage of amine end groups lost |
|---|---|---|---|---|
| | Before test | After test | Loss | |
| 6a | 0.3186 | 0.2972 | 0.0214 | 38.6 |
| 6b | 0.3210 | 0.2993 | 0.0217 | 39.7 |
| 6c | 0.3175 | 0.2681 | 0.0394 | 45.2 |
| 7 | 0.3130 | 0.2778 | 0.0352 | 43.9 |
| 8 | 0.3174 | 0.2694 | 0.0480 | 52.6 |

We claim:

1. A heat-stabilized polyamide composition comprising a synthetic linear polyamide having recurring amide groups as integral parts of the main polymer chain, and stabilizing amounts of phosphine or of an organo phosphine having the general formula:

$$PHX_1X_2$$

wherein $X_1$ and $X_2$ each independently represent a hydrogen atom, or an alkyl, cycloalkyl, aralkyl, or aryl group, any one of which may be substituted by hydroxyl, carboxyl or amino groups and when $X_1$ and $X_2$ represent alkyl, aralkyl or aminoalkyl groups, $X_1$ and $X_2$ together may form a bivalent radical which together with the phosphorus atom forms a heterocyclic ring.

2. Synthetic linear polyamides as claimed in claim 1 wherein one of $X_1$ and $X_2$ represents a hydrogen atom and the other represents an alkyl group containing up to 18 carbon atoms.

3. Synthetic linear polyamides as claimed in claim 2 wherein the alkyl groups contain from eight to 18 carbon atoms.

4. Synthetic linear polyamides as claimed in claim 3 wherein the phosphine incorporated into the polyamide is laurylphosphine.

5. Synthetic linear polyamides as claimed in claim 3 wherein the phosphine incorporated into the polyamide is stearyl phosphine.

6. Synthetic linear polyamides as claimed in claim 1 wherein the amount of stabilizing phosphine or organophosphine incorporated into the polyamide is such that the polyamide contains from 10 to 5000 parts per million of phosphorus.

7. Synthetic linear polyamides as claimed in claim 1 wherein the stabilizing phosphine or organophosphine is used in conjunction with a phenolic stabilizer which carries a tertiary alkyl group in the *ortho* or *para* position to the phenolic hydroxyl group.

8. Synthetic linear polyamides as claimed in claim 7 wherein the phenolic stabilizer is 1,1,3-tris-(2'-methyl-4'-hydroxy-5'-tert-butylphenyl)butane or 1,1,5,5-tetrakis-(2'-methyl-4'-hydroxy-5'-tert-butylphenyl)pentane.

9. Synthetic linear polyamides as claimed in claim 7 wherein the amount of phenolic stabilizer incorporated into the polyamide is from 0.01 to 10 percent calculated on the weight of the polyamide.

* * * * *